Jan. 21, 1964  G. A. STANZEL  3,118,427
BUNT BAG
Filed Sept. 19, 1962
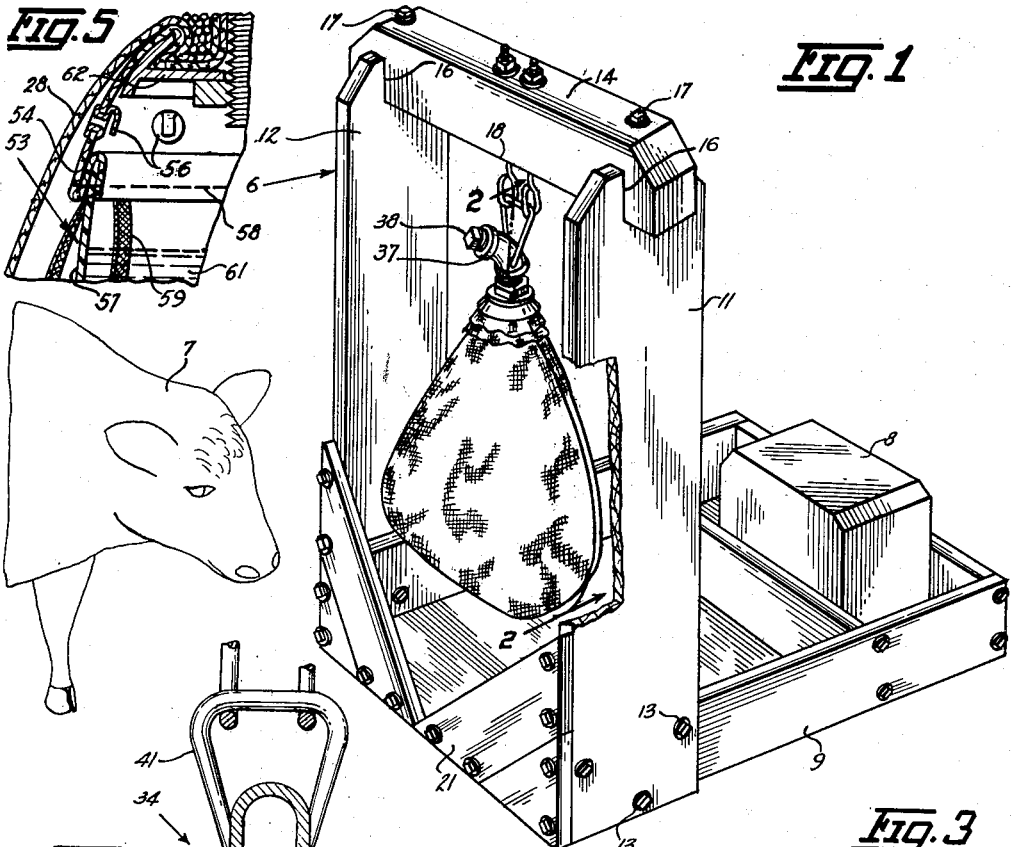
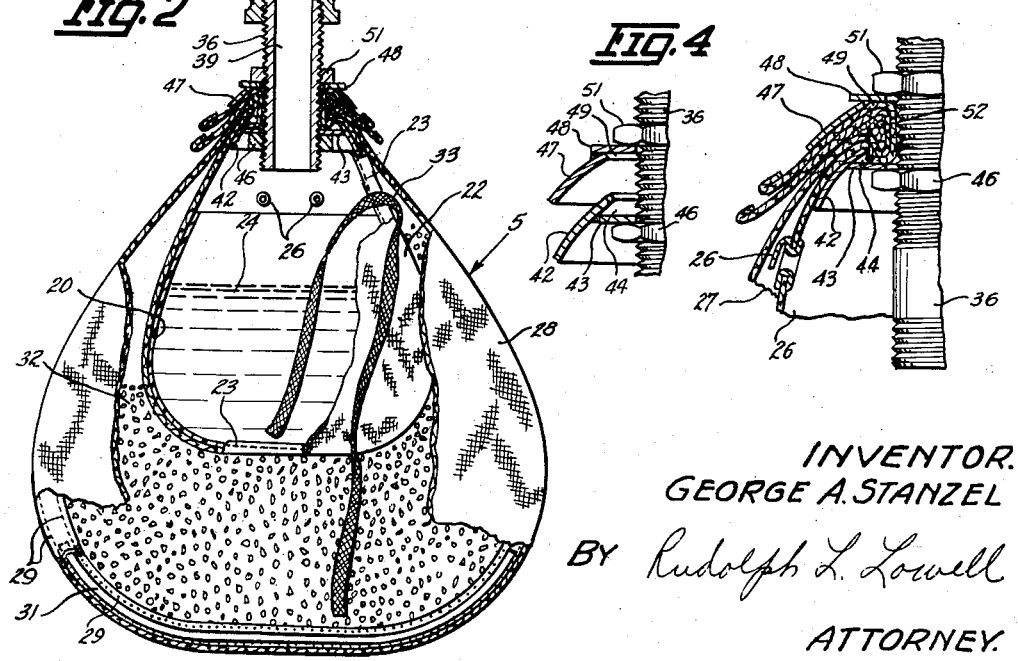
INVENTOR.
GEORGE A. STANZEL
BY Rudolph L. Lowell
ATTORNEY.

United States Patent Office 3,118,427
Patented Jan. 21, 1964

3,118,427
BUNT BAG
George A. Stanzel, Scottsdale, Ariz., assignor to Research Industries, Inc., Des Moines, Iowa, a corporation of Iowa
Filed Sept. 19, 1962, Ser. No. 224,808
12 Claims. (Cl. 119—157)

The present invention relates to an apparatus for the application of a liquid insecticide to animals and more particularly to an insecticide impregnated bag which is engaged by the face of cattle, sheep, horses and other animals to control insects such as face flies.

It is an object of the present invention to provide a relatively simple and economical, durable, compact and effective apparatus for the application of a liquid insecticide to the faces of cattle.

Another object of the invention is to provide a liquid insecticide applicator for animals which can be readily and quickly installed and serviced out in the prairie or in the feed lot with a minimum of tools and wherein the insecticide applicator can be directly filled without being disassembled.

A further object of the invention is to provide a liquid insecticide impregnated bag which contains a liquid reservoir and which on engagement by the animal is agitated and dispenses the insecticide to the exterior of the bag.

Still another object of the invention is to provide a unitary liquid insecticide dispensing apparatus which contains a minimum number of parts and utilizes the same structure to hold the apparatus on support means, to secure the several parts of the apparatus into a single unit, and to provide an inlet passage or filler section for the liquid insecticide.

According to the invention, a liquid insecticide dispensing apparatus is supported on a frame above the ground at a level such that cattle must engage the apparatus to reach minerals or salt. The apparatus is a complete unit which comprises a liquid reservoir bag surrounded by a larger liquid dispensing bag containing particles of a liquid absorbent material. A ribbon or wick extends from the liquid in the reservoir bag to the dispensing bag to move the liquid by capillary action to the absorbent material. The top end of the reservoir bag contains at least one shielded passage to permit liquid insecticide to flow to the absorbent material when the apparatus is inverted or turned on its side. The tops of the reservoir and dispensing bags are secured together with a clamp means which is provided with an inlet passage for supplying liquid to the liquid bag and a handle for holding the apparatus in a hanging position on a frame. The bags and clamp means therefor form a compact package unit which functions to dispense liquid insecticide.

The exact nature of the invention as well as other objects and advantages thereof will be readily apparent from the consideration of the following specification relating to the annexed drawing in which:

FIGURE 1 is a perspective view of the insecticide applicator of the present invention mounted on a frame to show the relationship between the applicator and the face of a steer;

FIGURE 2 is a sectional view taken along the line 2—2 of the insecticide applicator shown in FIGURE 1;

FIGURE 3 is an enlarged sectional view of the clamping means holding the bags together;

FIGURE 4 is a sectional view of the recessed clamping means, and

FIGURE 5 is a fragmentary elevation view in section of a modified liquid reservoir container usable with the insecticide applicator shown in FIGURE 1.

Referring to the drawing, there is shown in FIGURE 1 an insecticide applicator 5 supported on the upright frame 6. The frame holds the applicator 5 above the ground between the steer 7 and a salt block 8. The vertical height of the applicator 5 is such that the face of the steer 7 must nudge, butt, or bunt the applicator out of the way before the steer has access to the salt. The frame 6 contains a base 9 adapted to confine the salt 8. A pair of vertically extending supports 11 and 12 are secured to the forward portion of the base 9 by means of conventional bolts 13. The horizontal distance between the supports 11 and 12 is sufficiently small to prohibit the steer from passing therebetween. A cross bar 14 is positioned in notches 16 in the upper ends of the supports 11 and 12 and is secured thereto by means of screws 17.

The insecticide applicator 5 is centrally supported between the vertically extended supports 11 and 12 on the cross member 14 by means of a pair of eye bolts 18 having vertical oblong eyes 19 with the lateral distance between the vertical supports 11 and 12 and the central location of the insecticide applicator 5 being such that the face of the steer 7 must contact the applicator 5 before the steer can reach the salt 8. In order to prevent the steer 7 from walking through the frame 6, guard planks 21 are secured to the lower forward portion of the vertical extending members 11 and 12. The frame 6 can be installed in a fence line to force the steer to bunt or nudge the applicator before reaching the salt.

Referring to FIGURE 2, the insecticide applicator 5 has a liquid reservoir bag 22 which is flat and pear-shaped with the open end being the small end. The bag 22 consists of two sheets of canvas material secured together as by stitches 23 along the peripheral edges thereof and confines a predetermined amount of liquid insecticide 24. About three-fourths of the lower portion of the bag 22 is coated or impregnated with a plastic material 20 to make it fluid impervious and the upper porous portion of the bag 22 permits fluid to ooze therethrough. When an animal bunts the applicator the fluid insecticide is agitated and thereby engages the upper porous portion of the bag 22 and oozes therethrough. A plurality of grommets 26 are placed in the walls of the reservoir bag 22 adjacent the top end thereof. Each grommet provides a passage through the bag for the liquid insecticide and air. Each grommet includes an integrally formed tongue 27 the purpose of which will be described in detail.

A flat and pear-shaped dispensing bag 28 is made from two sheets of wear resisting material, as canvas, secured together along their peripheral edges by stitches 29. In order to maintain a substantially flat shape of the dispensing bag, an elongated rod 31 having curved ends is secured in the bottom portion of the bag 28 by the stitches 29. The dispensing bag 28 is positioned about the reservoir bag 22 and is partially filled with articles of insecticide absorbent material 32 such as steam-puffed sawdust and vermiculite. The material 32 provides the applicator with a bulky shape and applies the insecticide to the exterior surfaces of the dispensing bag 28. The liquid insecticide 24 in the reservoir bag 22 is moved by capillary action through capillary material 33 or wicks such as flat yarn rope material. The capillary material 33 is secured by the stitches 23 to the reservoir bag 22 and has one end extended into the liquid insecticide 24 and the opposite end positioned at the bottom of the dispensing bag 28. The material 33 continuously supplies a small amount of liquid insecticide to the absorbent material 32.

In the event that the amount of liquid insecticide being supplied to the absorbent material 32 is insufficient to saturate the exterior surface of the dispensing bag 28, the applicator may be turned upside down or laid on its side to allow the liquid 24 to pass through the passages in the grommets 26. The tongues 27 extended in a spaced relation over the grommet openings prevent the particles of absorbent material 32 from clogging these openings or entering into the reservoir formed by the bag 22.

The reservoir bag and dispensing bag are secured together by a clamping means 34. The clamping means includes a straight piece of externally threaded pipe 36 having a 45° elbow 37 secured to its upper end. A plug 38 threadably connected to the elbow 37 closes the passage 39 formed by the elbow 37 and the pipe 36. This passage leads to the interior of the reservoir bag 22. The reservoir bag may be filled with liquid insecticide by removing the plug 38 and pouring the liquid through the passage 39. A U-shaped handle 41 welded or brazed to the outside wall of the elbow 37 provides a horizontal rod which extends through the eyes 19 of the bolts 18 shown in FIGURE 1 so that the applicator may be readily and conveniently secured in a pendulous manner from the frame 6. The eye bolts 18 and the handle 41 prevent the twisting or turning of the applicator 5 on the frame 6 by the animals so that the flat side thereof always faces the animals. The vertical oblong shape of the eyes 19 permits limited universal movement of the applicator 5.

Referring to FIGURES 3 and 4, the top portions of the reservoir and dispensing bags 22 and 28 are clamped together and are forced into a bag holding recess by the clamping means 34. The clamping means has a first conical member 42 having an inner diameter considerably larger than the outer diameter of the pipe 36. A flat annular member 43 having a center hole slightly larger than the diameter of the pipe 36 is secured to the mid portion of the inner periphery of the member 43 thereby defining a recess 44. The conical member 42 and flat member 43 are positioned on the pipe 36 by a nut 46 threaded thereon. A second conical member 47 is complementary to the conical member 42 and is secured to a flat annular member 48 at the outer edge of its inner periphery. The conical member 47 and flat member 48 form a recess 49 opposite the recess 44. A nut 51 threaded on the pipe 36 engages the flat member 48 to force the conical member 47 toward the conical member 42.

The top of each bag 22 and 28 is folded back and secured around the pipe 36 by a plurality of turns of a cord 52. The cord urges the tops of the bags into the recesses 44 and 49 and provides bulk material to fill the space between the recesses. When the nut 51 is turned down the opposed friction surfaces of the conical members 42 and 47 clamp the top portions of the bags therebetween. The wad or folds of material in the annular area defined by the recesses 44 and 49 are compressed into the recesses thereby forming a bead which will not slip between the opposed surfaces of the conical members 42 and 47. After the initial compression or clamping of the top portions of the bags between the conical surfaces there is no need to disassamble the coupling means from the bag as the liquid insecticide is placed in the reservoir bag 22 through the passage 39.

As shown in FIGURE 1 the steer 7 must bunt, or force the applicator 5 with his face in order to reach the salt block 8. The liquid insecticide present on the outer surface of the dispensing bag 28 is transferred to the face of the steer where it effectively disposes of the insects thereon. When the steer strikes the applicator 5 the liquid insecticide is agitated and the position of the bag is such that some of the liquid insecticide may ooze through the upper porous portion of the bag and flow through the passages in the grommets 26 each time the steer bunts the applicator 5.

The modified liquid reservoir container 53, shown in FIGURE 5, may replace the reservoir bag 22 in the insecticide applicator. The container 53 is formed with a top and bottom member. The top member 54 is an annular liquid porous skirt which has a plurality of grommets 56 secured therein and forms about one-third the height of the container. The bottom member 57 is in the shape of a bag and made of synthetic rubber or plastic which has the characteristics of being liquid impervious and resistant to the deterioration from liquid insecticide. The top member 54 is firmly secured to the top edge portion of the bottom member 57 by stitches, rivets or glue. Elongated capillary rope 59 extends between the top and bottom members and is secured therebetween by the connecting means 58 so that one part of the rope 59 extends into the liquid insecticide 61 and the other outside the container 53. In order to provide a firm connection and distribute the forces on the connecting means 58 the top member may be folded over the top edge portion of the bottom member and the connecting means 58 may extend through the folds.

The recessed clamp element 62 shown in FIGURE 5 is a one piece member which may be formed by forging, casting and like methods. The upper recessed clamp element (not shown) may be a similar one piece member.

While there have been shown, described and pointed out the fundamental novel features of the invention as applied to a preferred embodiment, it will be understood that various omissions, substitutions, changes in form and details of the apparatus illustrated may be made by those skilled in the art without departing from the scope of the invention as defined in the appended claims.

I claim:

1. An apparatus for applying an insecticide to cattle comprising:
    (a) a reservoir means for holding a predetermined quantity of liquid insecticide,
    (b) a liquid dispensing means positioned about said reservoir means,
    (c) liquid absorbent means positioned in the liquid dispensing means,
    (d) elongated means secured to the reservoir means and having one end disposed in the reservoir means and the other end extending into the dispensing means so that liquid in the reservoir means will be carried by capillary attraction from the reservoir means to the absorbent means within the dispensing means, and
    (e) coupling means securing the reservoir means and dispensing means together thereby forming a unitary apparatus.

2. An apparatus for applying an insecticide to animals comprising:
    (a) a reservoir bag means for holding a predetermined quantity of liquid insecticide,
    (b) a liquid dispensing bag means positioned about said reservoir bag means, said dispensing bag means being substantially larger than said reservoir bag means,
    (c) liquid absorbent particles positioned in the liquid dispensing bag means,
    (d) elongated means secured to the reservoir bag means and having one end disposed in the reservoir bag means and the other end extending into the dispensing bag means so that liquid in the reservoir bag means will be carried by capillary attraction from the reservoir bag means to the particles within the dispensing bag means, and
    (e) coupling means securing the open ends of each bag means together thereby forming a unitary apparatus.

3. The apparatus defined in claim 2 wherein the coupling means includes a passage leading into the reservoir bag means, a removable plug closing said passage, and a handle adapted to be secured to frame structure to support the apparatus in the proper position.

4. The apparatus defined in claim 2 wherein the reservoir bag means includes at least one passage in its wall adjacent the open end thereby permitting the liquid insecticide to flow into the liquid dispensing bag means when the apparatus is turned from its normal vertical position.

5. An apparatus for applying an insecticide to cattle comprising:
    (a) a reservoir means for holding a predetermined quantity of liquid insecticide,
    (b) liquid dispensing means enclosing said reservoir means, (c) a plurality of liquid absorbent particles positioned in the liquid dispensing means, (d) means interconnecting the reservoir means and the liquid dispensing means for continuously supplying the dispensing means and liquid absorbent particles therein with small amounts of insecticide, and (e) coupling means securing the reservoir means and dispensing means together thereby forming a unitary apparatus.

6. The apparatus defined in claim 5 wherein the coupling means includes a passage leading into the reservoir means, a removable plug closing said passage, and a handle adapted to be secured to frame structure to support the unitary apparatus.

7. The apparatus defined in claim 5 wherein the reservoir bag means includes at least one passage in its wall adjacent the open end thereby permitting the liquid insecticide to flow into the liquid dispensing bag means when the apparatus is turned from its normal vertical position.

8. An apparatus for applying an insecticide to cattle comprising:

(a) reservoir means having a lower fluid impervious portion and an upper porous portion for storing a predetermined quantity of liquid insecticide and dispensing said insecticide when the reservoir means is turned from its normal vertical position, (b) a liquid dispensing means positioned about said reservoir means, (c) liquid absorbent particles positioned in the liquid dispensing means, and (d) coupling means securing the reservoir means and dispensing means together thereby forming a unitary apparatus.

9. An apparatus for applying an insecticide to cattle comprising:

(a) a reservoir means having a lower fluid impervious portion and an upper porous portion for storing a predetermined quantity of liquid insecticide and dispensing said insecticide when the reservoir means is turned from its normal vertical position, (b) liquid dispensing means enclosing said reservoir means, (c) a plurality of liquid absorbent particles positioned in the liquid dispensing means, (d) means interconnecting the reservoir means and the liquid dispensing means for continuously supplying the dispensing means and liquid absorbent particles therein with small amounts of insecticide, and (e) coupling means securing the reservoir means, and dispensing means together thereby forming a unitary apparatus.

10. The apparatus defined in claim 9 wherein the reservoir bag means includes at least one passage in its wall adjacent the open end thereby permitting the liquid insecticide to flow into the liquid dispensing bag means when the apparatus is turned from its normal vertical position.

11. A liquid reservoir insecticide container for an insecticide applying apparatus comprising:

(a) a bag-shaped bottom member formed from material which is liquid impervious and resistant to deterioration from liquid insecticide, said bottom member having a height of about two-thirds the height of the container, (b) an annular skirt member formed from material which permits liquid insecticide to ooze therethrough, (c) a plurality of grommets secured to the skirt member forming shielded passages therethrough, and (d) means securing the annular skirt member to the top portion of the bottom member thereby forming a container which has a lower liquid impervious portion and an upper liquid porous portion.

12. The apparatus defined in claim 1 wherein the reservoir bag means includes at least one passage in a portion thereof adjacent the open end thereby permitting the liquid insecticide to flow into the liquid dispensing bag means when the apparatus is moved from its normal vertical position.

References Cited in the file of this patent

UNITED STATES PATENTS

| 664,158 | Blake | Feb. 27, 1900 |
| 2,438,731 | Wedeking | Mar. 30, 1948 |
| 2,667,859 | Murray et al. | Feb. 2, 1954 |
| 2,777,421 | Hiebert | Jan. 15, 1957 |
| 2,921,401 | Kawamura | Jan. 19, 1960 |
| 2,946,310 | Rogers | July 26, 1960 |
| 3,016,879 | Ryan | Jan. 16, 1962 |
| 3,046,942 | Hale | July 31, 1962 |

FOREIGN PATENTS

| 154,396 | Great Britain | Dec. 2, 1920 |